(No Model.) 2 Sheets—Sheet 1.
F. PIERCE.
ELECTRICAL BURGLAR ALARM.
No. 440,115. Patented Nov. 4, 1890.
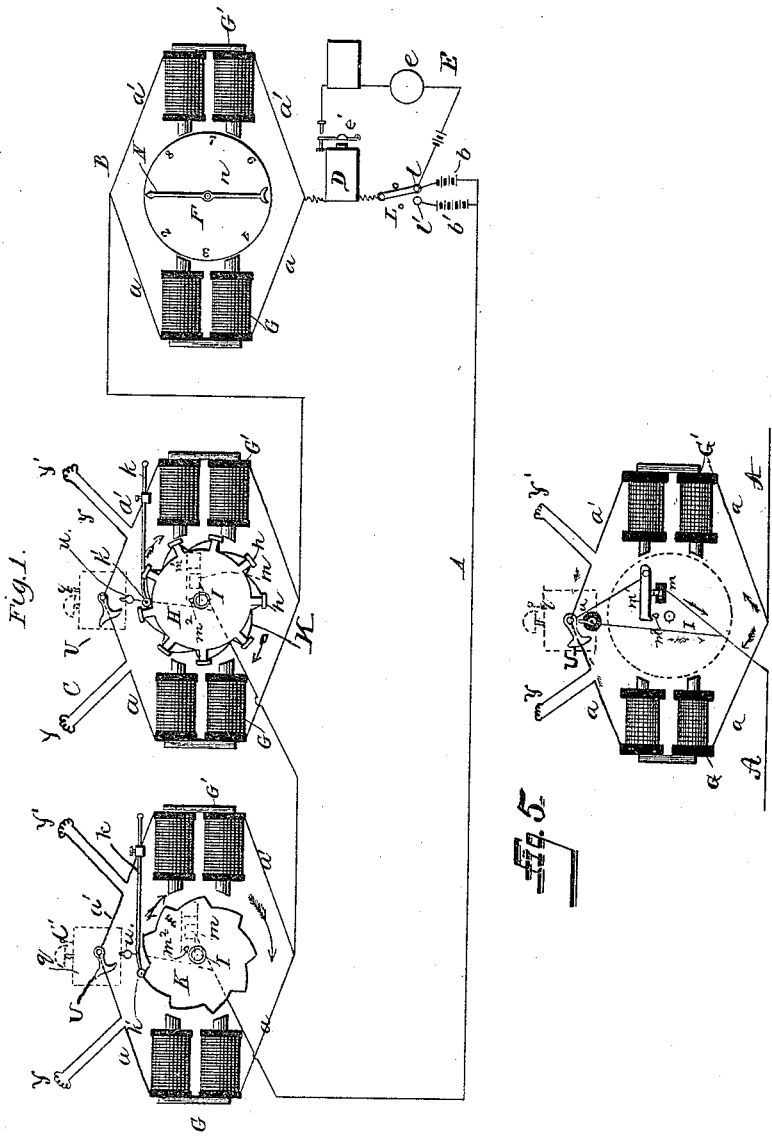
Witnesses
Will T. Norton
Parker H. Sweet Jr.
Inventor
Francis Pierce
By his Attorney
Fred. H. Royce.

(No Model.) 2 Sheets—Sheet 2.
F. PIERCE.
ELECTRICAL BURGLAR ALARM.
No. 440,115. Patented Nov. 4, 1890.
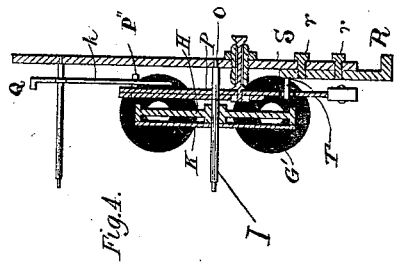
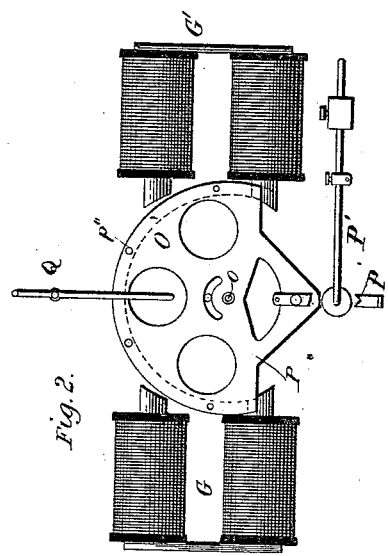
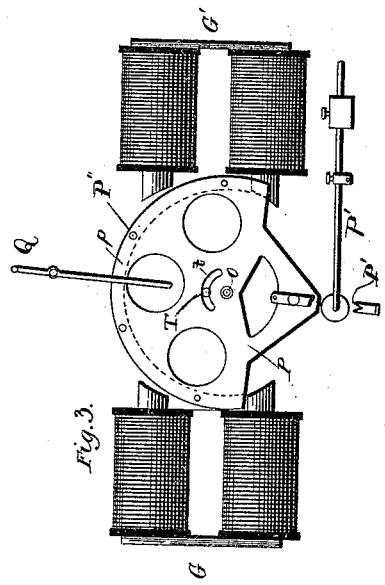
Witnesses
Inventor
Francis Pierce.
By his Attorney
Fred. W. Royce.

UNITED STATES PATENT OFFICE.

FRANCIS PIERCE, OF PHILADELPHIA, PENNSYLVANIA, ASSIGNOR OF ONE-HALF TO WILLIAM J. PHILIPS, OF SAME PLACE.

ELECTRICAL BURGLAR-ALARM.

SPECIFICATION forming part of Letters Patent No. 440,115, dated November 4, 1890.

Application filed May 8, 1889. Serial No. 309,985. (No model.)

*To all whom it may concern:*

Be it known that I, FRANCIS PIERCE, a citizen of the United States, residing at Philadelphia, in the county of Philadelphia and State of Pennsylvania, have invented new and useful Improvements in Electrical Burglar-Alarms; and I do hereby declare the following to be a full, clear, and exact description of said invention, reference being had to the accompanying drawings, and to the letters of reference marked thereon, which form a part of this specification.

This invention relates to electrical burglar-alarms of the kind wherein electric circuits extend between a number of buildings, which shall herein be referred to as "stations," and a central office where watchmen or operators are kept, means being employed to indicate at the central office any attempt which may be made to gain access to the guarded premises.

The object of my improvement is to afford the same or a greater degree of security with a number of alarms in one circuit as is now afforded by individual-wire systems.

The object of my invention is, furthermore, to furnish means at the central office for testing the condition of the circuit, and also for detecting from which station an alarm proceeds, without having recourse to a local battery at the place protected.

The object of the invention is, furthermore, to provide means for detecting the shunting, crossing, or grounding of the wires in protected premises.

The invention consists in the combination, with the main line having a weak galvanic battery or other source of electric energy connected thereto, of branch wires connected to electro-magnets arranged on opposite sides of a wheel having a series of armatures on its periphery, the said wheel being normally held at rest against the action of the current from the weak battery by a pawl-and-ratchet or other stop mechanism and a stronger battery adapted to be connected by the operator to the main line to rotate simultaneously the said armatures, and thereby momentarily open the circuit at one of the stations and sound an "O. K." alarm in the central office, whereby a succession of such test-signals from all the stations may be received.

The invention consists, furthermore, in the combination, with the main line, branch wires, electro-magnets, and rotary or wheel armatures, turning simultaneously in the same direction and adapted to successively open the circuit, of an indicator located at the central office to show from which station a signal is received.

The invention consists, furthermore, in certain novel details of construction and arrangement of parts, fully described hereinafter in connection with the drawings, and specifically pointed out in the accompanying claims.

In the accompanying drawings, Figure 1 is a diagram of my improved burglar-alarm system, showing a central office and two stations connected to the main line. Fig. 2 is a detail view of one of the stations, showing the balanced armature in the normal or "set" position. Fig. 3 is a similar view showing the balanced armature after its equilibrium has been disturbed. Fig. 4 is a vertical central sectional view of the same in the position shown in Fig. 2, and Fig. 5 is an enlarged detail view of one of the stations.

Referring to the drawings, in which similar letters of reference denote corresponding parts in all the figures, A designates the main line, which is provided at the central office, represented by B, with a light battery $b$, a relay D, to which is connected the local circuit E and an indicator F. The local circuit is provided with an alarm device, indicated at $e$, which is sounded when the lever $e'$ of the relay completes the local circuit, the latter being normally held open by the power of the main-line battery. The main line is also provided at the various stations C and C' with branch wires $a$ and $a'$, which are connected, respectively, to electro-magnets G and G', which are arranged on opposite sides of a rotating wheel H, having a series of armatures $h$ upon its periphery. This armature-wheel is fixed on a shaft I, on which is also arranged the ratchet-wheel K, that is engaged by a weighted pawl $k$. This pawl is provided at its extremity with an anti-friction roller $k'$, which bears on the periphery of the ratchet-wheel and normally holds the latter in such position that the rotary armature H is held at rest when the electro-magnets are excited by the weak battery. The switch L, which is arranged in the main line at the central office, is normally in contact with a point $l$, thereby connecting the weak battery, above described, with said line; but when this switch is swung into contact with a point $l'$ the stronger battery $b'$ is connected to the main line. The current generated by the weak battery is insufficient to draw the armature-wheel around against the power of the pawl; but when the stronger battery is connected the armature-wheel is rotated in the direction indicated by the arrows in Fig. 1 until two diametrically-opposite armatures are in front of the poles of the magnets. As soon as the strong battery is thrown out of circuit by swinging the switch-arm back to the point $l$, the armature is farther rotated (in the direction indicated by the arrows) by the pressure of the pawl on the inclined teeth of the ratchet, thereby drawing the armatures away from the electro-magnets. The armature-wheel is only capable of rotation in one direction, (owing to the action of the pawl,) and therefore if the stronger battery is connected successively a sufficient number of times the armature-wheel will make a complete revolution.

A circuit-breaker consisting of the insulated post $m$, connected to one terminal of the main line and a lever-key $m'$, connected to the other terminal of the main line and normally in contact with the post, is arranged adjacent to the armature-wheel in such position that a stud $m^2$ on the said wheel will when the latter is rotated raise the key and open the circuit, thereby operating the relay D and sounding an alarm in the local circuit. This is a "test" signal caused by the operator at the central office, and signifying to him that the station from which the alarm is received has not been tampered with.

The armature-wheel in each of the stations is provided, as above described, with studs to operate circuit-breakers similar to that described; but the studs are arranged in different relative positions on the said wheels, whereby the "test-signal" can be sounded from only one station at a time. Thus after the test has been made with one station it is necessary to apply the tests successively to all the remaining stations on the line before the first station is again reached—that is, the armature-wheel of the first station must complete a revolution before it can again break the circuit and sound the alarm.

The main line is provided at the central office with branch wires $a$ $a'$, electro-magnets G G', an armature-wheel, ratchet-wheel, and pawl similar to those above described, and the shaft to which the armature-wheel is affixed carries a pointer N, traveling over an indicator-dial $n$, containing a series of numbers corresponding to the number of stations on the line. When the strong battery is connected to the main line, this pointer is turned by the action of the current simultaneously with the armature-wheels of the stations, thereby indicating successively the stations from which the signals are received.

A balanced armature O, pivoted at $o$ slightly below its center of gravity, so as to be in unstable equilibrium, is arranged between electro-magnets in the various stations, the said armature consisting of a thin plate P of non-magnetic metal having a soft-iron periphery $p$. This armature is so arranged that when the magnets are of equal power—that is, when the resistance Y in the branch $a$ is equal or approximately equal to the resistance Y' in the branch $a'$—their attractive force will be equal and the armature will remain at rest.

The resistances Y and Y' are represented in the drawings as branch wires, and if one branch is connected to the doors, windows, &c., throughout the protected premises the other branch must be connected to a resistance-coil of equal resistance to that found in the other branch. Thus the resistance-coil is arranged opposite to the protected doors and windows, and as the said coil and branch wires running to the windows and doors are connected, respectively, to the branches $a$ and $a'$, should the wires be crossed, as at $y$, thereby reducing the resistance on one side of the armature, the equilibrium of the latter will be disturbed by the greater strength of the current on that side.

The balanced armature is for the purpose of starting the local signal apparatus and is held in its normal or set position by a weighted arm P', whose free end engages in a shallow notch $p'$, and when the armature is disturbed its motion is accelerated by the action of the said weighted arm on the inclined lower edges on opposite sides of the notch. The balanced armature is also provided at suitable points near its periphery with the studs $p''$ $p''$, which engage the escapement-lever Q and release the alarm mechanism represented at $q$. The alarm mechanism may be of any ordinary or well-known construction operated by clock-work or other suitable means.

The automatic switch-arm U, which is connected to the alarm mechanism $q$ and forms the terminal of the branch wires, moves to a contact with the insulated point $u$, which is connected to the post $m$, whereby the current from the main line is diverted from the "test-points" $m$ $m'$ at the station affected. Thus if the distinctive signal for any reason should fail to register or be understood by the operator at the central office he would be enabled by applying the tests to determine from whence the signal proceeded.
A sliding arm R, which is mounted on guide-screws $r$ $r$ on the front plate S, is provided at its upper end with a pin T, operating in a curved opening $t$ in the balanced armature, which pin limits the displacement or swinging motion of the armature. By means of this bar the armature is reset.

The operation of the improved burglar-alarm system is as follows: The current from the weak battery is insufficient to rotate the armature-wheel. The equilibrium of the balanced armature depends wholly on the resistances in the two branch wires being equal, and therefore if the resistance in either branch is reduced by crossing the balanced armature is drawn toward the magnet, which is connected to the branch having the less resistance, and the distinctive alarm is sounded. The operator may test the condition of the circuit at any time as far as it affects any set alarm by applying the strong battery momentarily to the line in the manner before described. It is obvious that if any station is crossed or grounded out the operator would fail of his test-signal from that station, thus locating the trouble; also, should an alarm go off and the distinctive signal be confused for any reason the test-points at that station would be cut out, when the arm U moves to contact with $u$, and a test as above would locate the alarm. It will be seen that the armature-wheel is arranged in front of the poles of the magnets, while the balanced armature is disposed at the side thereof, thus enabling both armatures to be affected by the same electro-magnets. The teeth of the ratchet-wheel are V-shaped; but the side toward which the wheel rotates is slightly shorter and more abrupt than the other, so that the friction-roller passes over the said abrupt side of the tooth and bears on the opposite side of the same, (namely, the more gradual side,) while the strong battery is connected to the line, whereby when the latter is removed the ratchet-wheel is turned by the pressure of the pawl.

Having thus described my invention, what I claim, and desire to secure by Letters Patent, is—

1. In an electric burglar-alarm, the combination, with the main line having a weak battery, of the branch wires of approximately equal resistances connected to electro-magnets, the armature-wheel disposed between the said magnets and provided with a pawl-and-ratchet mechanism to normally hold the armature out of contact with the magnets, and the strong battery adapted to be connected to the main line to actuate the armature-wheel, substantially as specified.

2. In an electric burglar-alarm, the combination, with a main line having a weak battery and the relay located at the central office and connected to a local alarm-circuit, of the branch wires arranged at the stations and connected to electro-magnets, the armature-wheels disposed between the said magnets and provided with pawl-and-ratchet or stop mechanism to resist the current from the weak battery and prevent the attraction of the armatures, the circuit-breakers connected to the armature-wheels, and the strong battery adapted to be connected to the main line to actuate the armature-wheels and operate the circuit-breakers, substantially as specified.

3. In an electric burglar-alarm, the combination, with the main line normally connected to a weak battery and provided with a relay and local alarm-circuit at the central office, of the branch wires connected to electro-magnets, the rotary armature-wheels disposed between the said magnets and provided with pawl-and-ratchet or stop mechanism to resist the strength of the weak battery, the circuit-breakers connected to the armature-wheels, strong battery adapted to be connected to the main line, the balanced armatures arranged between the electro-magnets and connected to alarm mechanisms, and the automatic switch-arms connected to said alarm mechanisms to cut one of the electro-magnets out of circuit, substantially as and for the purpose specified.

4. In an electric burglar-alarm system, the combination, with the main line, of a station having branch wires connected, respectively, to electro-magnets, the rotary armatures disposed between said magnets and carrying a stud $m^2$, a circuit-breaker comprising a post $m$ and a key $m'$, normally in contact with the post and adapted to be operated by the said stud $m^2$, and the balanced armature influenced by the electro-magnets and connected to an alarm mechanism, substantially as and for the purpose specified.

5. In an electric burglar-alarm system, the combination, with the main line, of a station having branch wires, electro-magnets connected to the branch wires, a balanced armature arranged between the said magnets and having a limited rotary movement, and the weighted lever engaging a notch in the periphery of the said armature and adapted to accelerate the motion of the latter when its equilibrium is disturbed, substantially as and for the purpose specified.

6. In an electric burglar-alarm system, the main line having a station comprising branch wires, electro-magnets connected to said wires, a balanced armature arranged between the electro-magnets, a weighted lever engaging a notch in the periphery of the said armature, and a sliding bar provided with a pin to operate in a curved opening in the armature, substantially as and for the purpose specified.

7. An electric burglar-alarm system having at each station branch wires of normally-equal resistance and an electro-magnet in each branch, said electro-magnets acting to rotate in one direction an armature-wheel suspended between them and in opposite directions a balanced armature similarly placed, substantially as and for the purpose specified.

In testimony whereof I affix my signature in presence of two subscribing witnesses.

FRANCIS PIERCE.

Witnesses:
 SAML. G. DIEHL,
 JAMES TURNER.